United States Patent [19]

Draudt

[11] Patent Number: 5,228,946
[45] Date of Patent: Jul. 20, 1993

[54] MULTI-PLATE LAMINATION FIXTURE

[75] Inventor: Richard R. Draudt, Pittsboro, N.C.

[73] Assignee: E. I. Du Pont de Nemours and Company, Wilmington, Del.

[21] Appl. No.: 808,700

[22] Filed: Dec. 17, 1991

[51] Int. Cl.⁵ ............................................. B32B 31/00
[52] U.S. Cl. .................................. 156/580; 100/194; 100/199; 249/126; 425/186; 425/395
[58] Field of Search ............... 156/580; 249/120, 126; 100/178, 194, 195, 199; 425/383, 394, 395, 186

[56] References Cited

U.S. PATENT DOCUMENTS

| | | | |
|---|---|---|---|
| 768,668 | 8/1904 | Loewe et al. | 249/126 |
| 815,291 | 3/1906 | Haskell et al. | 100/199 |
| 1,059,274 | 4/1913 | Camp | 100/126 |
| 1,121,470 | 12/1914 | Bushnell | 100/126 |
| 1,639,430 | 8/1927 | Gammeter | 425/395 |
| 2,331,963 | 10/1943 | Da Cunha | 425/395 |
| 2,884,233 | 4/1959 | Thurnher | 100/126 |
| 3,473,465 | 10/1969 | Tonjum | 100/194 |
| 3,638,559 | 2/1972 | Parker | 100/199 |
| 3,750,563 | 8/1973 | Tonjum | 100/194 |
| 3,951,580 | 4/1976 | Hobson | 425/395 |
| 4,186,918 | 2/1980 | Ficker et al. | 271/232 |
| 4,431,474 | 2/1984 | Gronek et al. | 156/580 |
| 4,510,000 | 4/1985 | Kumar et al. | 156/89 |
| 4,709,446 | 12/1987 | Feauto et al. | 100/194 |
| 4,857,135 | 8/1989 | Copp | 156/580 |
| 4,875,966 | 10/1989 | Perko | 156/580 |
| 5,110,084 | 5/1992 | Hitrava et al. | 249/126 |

FOREIGN PATENT DOCUMENTS 575523  5/1959  Canada ........................... 100/199

*Primary Examiner*—David A. Simmons
*Assistant Examiner*—William J. Matney, Jr.

[57] ABSTRACT

A multi-plate lamination fixture includes at least a first, an intermediate and a bottom plate, of which the intermediate and either the bottom or the top plate each have a keyway therein adjacent one surface thereof and in which the intermediate and the other of the bottom or the top plate have a key projecting past the other surface thereof thereby to permit registered stackability of the plates. The intermediate and either the bottom or the top plate each also have a recess extending into one surface thereof for at least a predetermined distance, while the intermediate and the other of the bottom or the top plate have a pin projecting past the other surface thereof. The projecting pins are received in the recess of the adjacent plates to further assure accurate location of the stacked plates forming the lamination fixture.

4 Claims, 1 Drawing Sheet

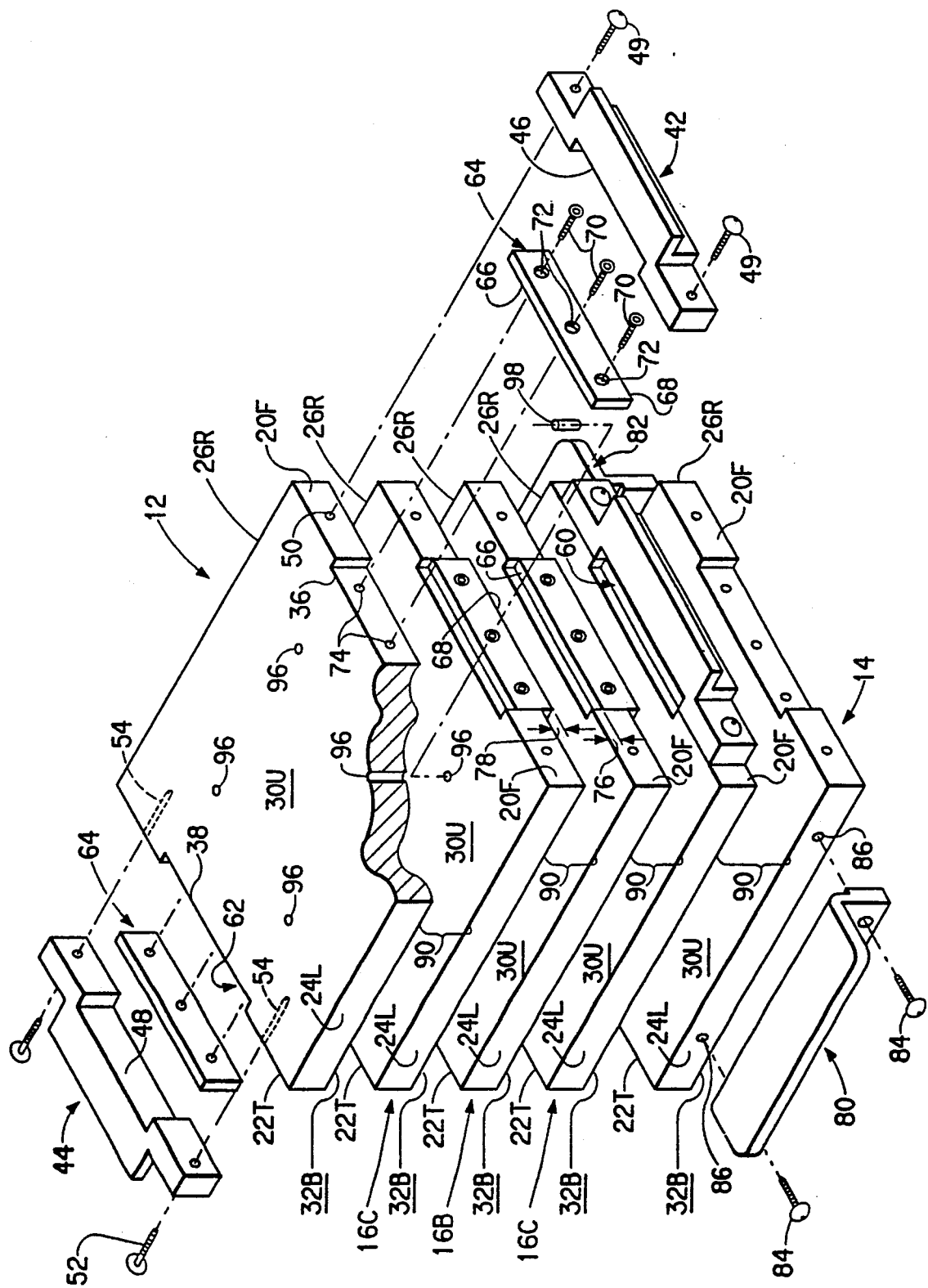

MULTI-PLATE LAMINATION FIXTURE

BACKGROUND OF THE INVENTION

1. Field of the Invention

The present invention relates to a lamination fixture for use prior to firing multilayered ceramic materials.

2. Description of the Prior Art

Presently, multilayered ceramic materials are laminated between a pressing die formed from a pair of superimposed parallel die plates. The plates are received within a press and pressure is applied to bond the ceramic materials. The throughput of such a system is limited.

It is therefore believed advantageous to provide a fixture arrangement whereby the lamination throughput of multilayered ceramic materials may be increased.

SUMMARY OF THE INVENTION

The present invention relates to a single lamination plate and to a fixture formed from a plurality of such lamination plates for use in laminating an unfired ceramic multilayered material.

A lamination plate in accordance with one aspect of the present invention has a first surface and a second surface thereon, with at least a portion of the perimeter of the lamination plate being generally linear. A keyway is formed in the first surface of the plate along the linear portion of the perimeter thereof, with a key being mounted to the plate in the keyway. A portion of the key protrudes past the second surface of the plate. The lamination plate has a recess extending a predetermined distance into the lamination plate from one surface thereof and a positioning pin projecting above the other surface of the lamination plate for a distance less than the predetermined distance.

In accordance with another aspect of the invention a lamination fixture for use in laminating an unfired ceramic multilayered material includes a top lamination plate, at least one intermediate lamination plate, and a bottom lamination plate. Each lamination plate has a first and a second surface thereon, with at least a portion of the perimeter of each lamination plate being generally linear, each lamination plate having a keyway formed in the generally linear portion of the perimeter thereof. The top and the intermediate lamination plates each having a key mounted in the keyway thereof. Each key has a first edge and a second edge thereon, with each key being arranged in the keyway with respect to the surfaces of the lamination plate to which it is mounted such that the first edge of the key is offset below the first surface of the lamination plate and the second edge of the key protrudes past the second surface of the plate. The plates defining the fixture are stackable such that the protruding second edge of the key on the top and intermediate lamination plates respectively extends into the keyway on the intermediate and bottom lamination plates. Yet further, a recess extends a predetermined distance into the second surface of the top and the intermediate lamination plates; and a positioning pin projects above the first surface of the intermediate and the bottom lamination plates, each for a distance less than the predetermined distance. When stacked the positioning pin projecting above the first surface of the intermediate and the bottom lamination plates respectively extends into the recess in the second surface of the top and the intermediate lamination plates.

BRIEF DESCRIPTION OF THE DRAWINGS

The invention will be more fully understood from the following detailed description thereof taken in connection with the accompanying drawings, which form a part of this application and in which:

The FIGURE is a perspective view of a lamination fixture formed of a plurality of stackable lamination plates, in accordance with the present invention.

DETAILED DESCRIPTION OF THE INVENTION

With reference to the FIGURE shown is a perspective view of a lamination fixture generally indicated by the reference character 10 in accordance with the present invention. The fixture 10 is comprised of a top lamination plate 12, a bottom lamination plate 14, and at least one, but preferably a plurality, of intermediate lamination plate(s) such as those indicated in the Figure by the reference characters 16A, 16B and 16C. Each lamination plate 12, 14, 16A, 16B, and 16C is a generally square metallic member, preferably manufactured from D-2 chromium, heat treated R-58 Rockwell steel, for purposes of dimensional stability. Each lamination plate 12, 14, 16A, 16B, and 16C has (as viewed in the Figure) a frontal edge 20F, a trailing edge 22T, a lefthand edge 24L and a righthand edge 26R. Although all of the plates 12, 14, 16A, 16B, and 16C are shown in the Figure as square, it should be understood that they may be otherwise configured, so long as at least one edge of the perimeter of the plate is generally linear.

Each lamination plate 12, 14, 16A, 16B and 16C has an upper surface 30U and a bottom surface 32B thereon. The surfaces 30U, 32B are generally precisely finished, preferably exhibiting an rms finish on the order of 16 microinches.

A portion of at least one edge (e.g., the frontal edge 20F) and preferably, also the opposed parallel edge (e.g., the trailing edge 22T) of each lamination plate 12, 14, 16A, 16B, and 16C has a generally rectangular portion 36, 38, respectively, removed therefrom, thereby to define a slot between the upper surface 30U and the bottom surface 32B of each lamination plate. Each of the lamination plates 12, 14, 16A, 16B, 16C receives handles 42, 44, respectively attached to the frontal and trailing edges 20F, 22T thereof. For purposes of clarity of illustration, the handles 42, 44 are shown only in connection with the top lamination plate 12 and one of the intermediate lamination plates 16C. Preferably, but not necessarily, the back surfaces of the handles 42, 44 are provided with a recess, 46, 48, respectively. The handle 42 is secured to the lamination plate to which it is mounted by screws 49 received within bores 50 provided in the frontal edge 20F. In like manner, the handle 44 is secured to the lamination plate to which it is mounted by screws (e.g., the screw 52) received within similar bores 54 provided in the trailing edge 22T.

When secured to the plate to which it is mounted, the slot 36 in the frontal edge 20F of the plate cooperates with the handle 42 (and communicates with the slot 46, if therein provided) to define a keyway 60 opening on the upper surface 30U and extending along the frontal edge 20F of the plate. The resulting keyway 60 is believed best illustrated in connection with the plate 16C. Similarly, the cooperative interaction of the handle 44 (and any slot 48 therein) mounted to the trailing edge 22T of the plate defines a corresponding keyway 62 (not shown in the Figure for economy of illustration but similar to the keyway 60).

In accordance with this invention, the upper lamination plate 12 and the intermediate lamination plate(s) 16A (and 16B, 16C is used) each have a key 64 mounted in the keyway 60, (and 62) thereof. Each key 64 having a first, upper, edge 66 and a second, lower, edge 68 thereon. Each key 64 is secured in the keyway in which it is disposed by screws 70 that extend through openings 72 in the key 64. The screws 70 are received in bores 74 located in the material of the plate defining the slot 36 therein. Each key 64 is arranged in the keyway 60, 62 with respect to the surfaces 30U, 32B of the lamination plate to which it is mounted such that the first edge 66 of the key 64 is offset a predetermined distance 76 below the upper surface 30U of the lamination plate, while the second edge 68 of the key 64 protrudes a predetermined distance 78 below the second surface 32B of the plate.

If desired, the bottom lamination plate 14 may provided with handles 80, 82. Preferably, the handles 80, 82 are respectively secured to the remaining pair of opposed edges (i.e., in the context of the Figure, the edges 24L, 26R) of the plate 14 by screws 84 received in bores 86 formed in the edges 24L, 26R.

As should be apparent from the Figure the plates 12, 14, 16A, 16B and 16C are stackable one atop the other, pancake fashion. A laminate of unfired ceramic material, such as the material manufactured and sold by E. I. du Pont de Nemours and Company as "Green Tape" may be pressed between the bottom surface 32B of one plate and the upper surface 30U of an adjacent plate. When stacked, the protruding second edge 68 of the key 64 on the upper plate 12 and the intermediate lamination plate(s) 16A (16B and 16C) respectively extend(s) into the keyways 60, 62 on the remaining intermediate plates 16 and the bottom lamination plate 14.

Although the cooperative association of the key(s) 64 and keyway(s) 60, 62 is believed adequately to locate adjacent lamination plates with respect to each other, the lamination fixture 10 may be further more accurately located with respect to each other by another positioning arrangement. To this end each plate 12, 14, 16A, 16B and 16C is provided with at least one, but preferably a plurality of passages 96 that extend between the upper surface 30U and the bottom surface 32B of each plate. Each intermediate plate 16A, 16B, 16C used in the given fixture 10, as well as the bottom plate 14, has a positioning pin 98 extending a predetermined distance above one surface thereof (e.g., the upper surface 30U). Preferably, the positioning pin 98 is received within the upper region of each of the passages 96 opening onto the given surface. The portion of the passage(s) remaining once the pin 98 is received therein, may thus be appreciated to define a recess that extends at least a predetermined distance from the opposite surface (i.e., the surface 32B) of the lamination plates into the material thereof. The positioning pin 98 projects above the first surface (i.e., the surface 30U) of each of the intermediate and the bottom lamination plates for a distance less than the predetermined distance that the recess defined by the passages 96 extend into the material of the intermediate and upper lamination plates.

When stacked, the positioning pins projecting above the first surface of the intermediate and the bottom lamination plates respectively extends into the recess in the second surface of the top and the intermediate lamination plates.

Those skilled in the art, having the teachings of the present invention as hereinabove set forth, may effect numerous modifications thereto. For example, the relative position of features on the various of the top, intermediate and bottom lamination plates may be reversed: thus, the edge 66 of the key may extend above the surface 30U of a plate; and/or, the pins 98 may project from the bottom surface 32B of a lamination plate while the recess is received in the opposite surface of the adjacent cooperating plate. It should be understood that these and such modifications lie within the contemplation of the present invention, as defined by the appended claims.

What is claimed is:

1. A lamination plate for use in laminating an unfired ceramic multi-layered material, the lamination plate having a first surface and second surface, at least a portion of the perimeter of the lamination plate being generally linear, wherein the improvement comprises:

a portion of the generally linear portion of the perimeter of the lamination plate being removed inwardly of the perimeter to define a keyway extending from the first to the second surface of the lamination plate, a key mounted to the plate in the keyway formed therein, the key having an upper and a lower edge thereon, the upper edge of the key being offset from the first surface of the lamination plate such that a potion of the key protrudes past the second surface of the plate.

2. The lamination plate of claim 1 further comprising:

a recess extending a predetermined distance into the lamination plate from one surface thereof; and, a positioning pin projecting above the other surface of the lamination plate for a distance less than the predetermined distance.

3. A lamination fixture for use in laminating an unfired ceramic multi-layered material, the fixture comprising:

a top lamination plate, at least one intermediate lamination plate, and a bottom lamination plate, each lamination plate having a first and a second surface thereon, at least a portion of the perimeter of each lamination plate being generally linear, a portion of the generally linear of the perimeter of each lamination plate being removed inwardly of the perimeter thereof to define a keyway extending from the first to the second surface of the lamination plate, the top and intermediate lamination plates each having a key mounted in the keyway thereof, each key having a first edge and a second edge thereon, each key being arranged in the keyway with respect to the surfaces of the lamination plate to which it is mounted such that the first edge of the key is offset below the first surface of the lamination plate and the second edge of the key protrudes past the second surface of the plate, the plates being stackable such that the protruding second edge of the key on the top and intermediate lamination plates respectively extends into the keyway on the intermediate and bottom lamination plates.

4. The lamination fixture of claim 3 further comprising:

a recess extending a predetermined distance into the second surface of the top and the intermediate lamination plates; and, a positioning pin projecting above the first surface of the intermediate and the bottom lamination plates each for a distance less than the predetermined distance, when stacked, the positioning pin projecting above the first surface of the intermediate and the bottom lamination plates respectively extending into the recess in the second surface of the top and the intermediate lamination plates.

* * * * *